United States Patent
Saraswati

(10) Patent No.: US 9,367,465 B2
(45) Date of Patent: Jun. 14, 2016

(54) METHOD AND SYSTEM FOR IMPROVING MEMORY ACCESS PERFORMANCE

(75) Inventor: Sujoy Saraswati, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 2560 days.

(21) Appl. No.: 12/101,792

(22) Filed: Apr. 11, 2008

(65) Prior Publication Data

US 2008/0256524 A1 Oct. 16, 2008

(30) Foreign Application Priority Data

Apr. 12, 2007 (IN) .............................. 784/CHE/2007

(51) Int. Cl.
*G06F 9/45* (2006.01)
*G06F 12/00* (2006.01)
*G06F 12/08* (2016.01)

(52) U.S. Cl.
CPC ............ *G06F 12/0862* (2013.01); *G06F 8/443* (2013.01); *G06F 2212/6028* (2013.01)

(58) Field of Classification Search
CPC ............................ G06F 12/0862; G06F 8/443
USPC .................................. 717/140–161; 711/137
See application file for complete search history.

(56) References Cited

U.S. PATENT DOCUMENTS

| | | | | |
|---|---|---|---|---|
| 5,724,613 A * | 3/1998 | Wszolek | ............. | G06F 13/1631 710/100 |
| 6,119,222 A * | 9/2000 | Shiell | .................... | G06F 9/3802 711/E12.057 |
| 6,311,260 B1 * | 10/2001 | Stone | ...................... | G06F 9/383 711/137 |
| 6,421,826 B1 * | 7/2002 | Kosche et al. | ................ | 717/161 |
| 6,564,313 B1 * | 5/2003 | Kashyap | ................ | G06F 9/381 711/137 |
| 7,111,125 B2 * | 9/2006 | Hooker | ............... | G06F 9/30032 711/137 |
| 7,177,985 B1 * | 2/2007 | Diefendorff | ........ | G06F 12/0862 711/118 |
| 2003/0145314 A1 * | 7/2003 | Nguyen et al. | ................ | 717/158 |
| 2006/0101226 A1 * | 5/2006 | Benhase | ............. | G06F 12/1081 711/203 |
| 2012/0166733 A1 * | 6/2012 | Cherukuri | ........... | G06F 12/0862 711/137 |
| 2013/0013867 A1 * | 1/2013 | Manne | ................ | G06F 12/0862 711/137 |

OTHER PUBLICATIONS

"Daeyeon";"Adaptive softawre prefetching in scalable multiprocessors using cache information";"Jan. 12, 2001";"elsevier";"23 Pages".*

* cited by examiner

*Primary Examiner* — Wei Zhen
*Assistant Examiner* — Brahim Bourzik
(74) *Attorney, Agent, or Firm* — Brooks, Cameron & Huebsch, PLLC

(57) ABSTRACT

The present invention relates to a computing system which includes a processor and a memory. It also includes a memory access optimizer which is arranged to affect memory access of a program during runtime execution of the software. The program includes a plurality of application elements, each comprising a text field containing a text section, and a memory access field. The memory access optimizer is arranged to implement memory access data in the memory access field in order to affect memory access of the application element. The text section is unchanged by the memory access data implementation.

10 Claims, 3 Drawing Sheets

METHOD AND SYSTEM FOR IMPROVING MEMORY ACCESS PERFORMANCE

RELATED APPLICATIONS

This patent application claims priority to Indian patent application serial no. 784/CHE/2007, having title "A Method and System for Improving Memory Access Performance", filed on 12 Apr. 2007 in India, commonly assigned herewith, and hereby incorporated by reference.

BACKGROUND OF THE INVENTION

A parameter of processes running on a computing system is memory access performance. Programs include instructions and data. Both the instructions and data must be fetched from memory. The amount of time required to access data from memory by a program has an important effect on the performance of the program as well as the system, particularly where the system runs many processes. The amount of time required to access data from memory has a strong dependency on how and when the memory is accessed (the memory access pattern).

It is difficult to predict memory access patterns of a program during compilation, so the compiler cannot generate the most optimal access pattern in most cases.

It is known to provide "dynamic optimizers" which monitor the performance of a program at runtime and adjust the program in an attempt to improve memory access performance. The compiler generates application elements containing prefetch instructions in active or inactive form. The dynamic optimizer collects memory access related data for the software at runtime and activates, deactivates or modifies the prefetch instructions generated by the compiler in order to improve memory access patterns. This approach takes the runtime performance behaviour into account. However, the application elements need to be updated at runtime to achieve this. The prefetch instructions reside in a text section of the application elements, so any update involves writing to the text section.

By the term "application element" we mean a portion of a program, wherein the program is made up of a plurality of application elements. An application element includes instructions for the operation of the program.

Optimizing memory access at runtime by writing to the text field of an application element presents problems. In particular, where the program is associated with a library (e.g. in operating systems based on libraries and with support for copy-on-write) as soon as a write operation takes place on a text, a private copy is created. Shared libraries are usually mapped shared for application elements, so that the text section can be shared across processes. If the text has to be mapped private or it is mapped private on a write operation, this will have an affect on performance. More private pages increase pressure on the swap device. Moreover, if an update has to happen on the shared library memory access, irrespective of processes, each process has to update the private copy of the text in order to implement the change. Further, updating the text would require super user privileges for the dynamic optimizer to succeed (due to security reasons). Alternatively, a privilege instruction could be utilised to update the shared text. Although this solution would not require the text to be mapped private, it would require super user privileges and might need locks to safely update the text page. These potential problems make the dynamic optimizer approach slower.

Requiring updating of the text section of a software element may therefore inhibit the effectiveness of the dynamic optimizer.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
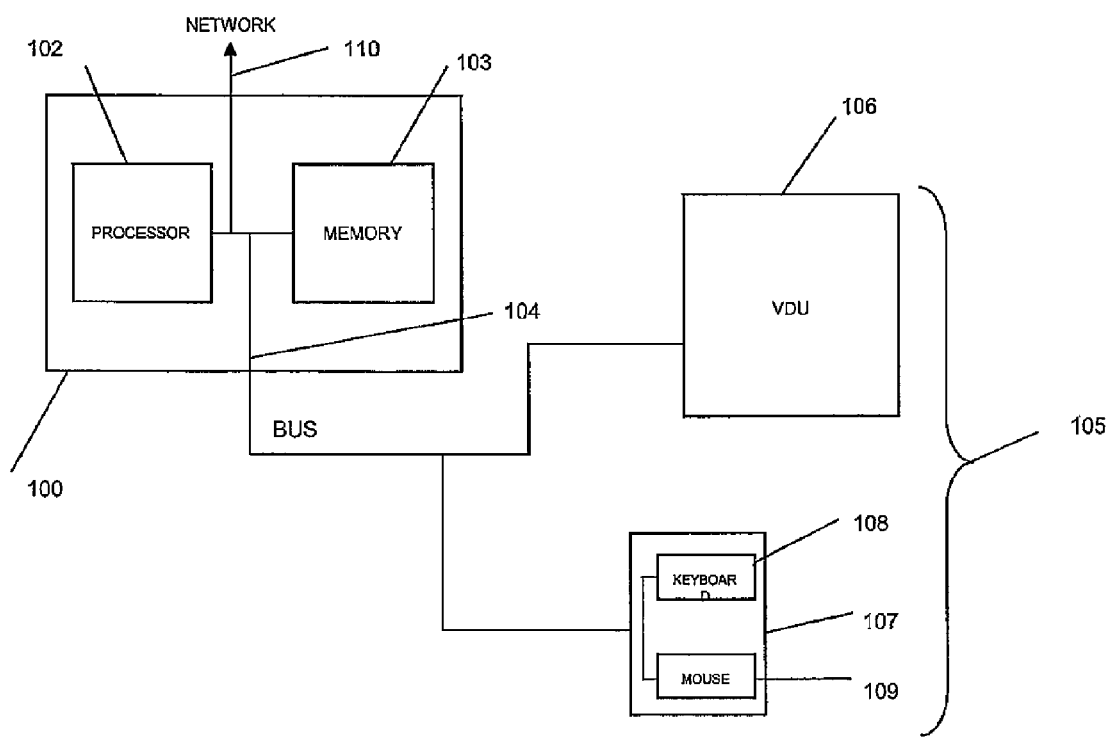
FIG. 1 is a diagram of a computing system in accordance with an embodiment of the present invention.

There will be provided a computing system for improving memory access patterns of a process implemented on a computer, such as, for example, a software program.

In one embodiment, the computing system comprises a processor, a memory, a memory access optimizer arranged to affect memory access patterns of a program during runtime execution of the program, the program including a plurality of application elements comprising a text field containing a text section, and a memory access field, the memory access optimizer being arranged to implement memory access data in the memory access field in order to affect memory access of the application element, whereby the text section being unchanged by the memory access data implementation.

In a further embodiment, the computing system comprises a processor, a memory, and a compiler arranged to implement memory access options in a program including a plurality of application elements, the memory access options being arranged to affect memory access patterns of the program during runtime, and the compiler being arranged to provide a memory access field in the application elements, wherein a value of a data in the memory access field is arranged to implement the memory access options.

In a further embodiment, the computing system comprises a processor, a memory, a program arranged for execution on the computing system, the program including a plurality of application elements comprising a text field having a text section and a memory access field having memory access data, the memory access data being arranged to affect memory access of the application element when the program is run.

There will also be provided a method for improving the memory access pattern of a process implemented on a computer, such as, for example, a software program.

In one embodiment the method comprises a method of adjusting a program in order to improve a memory access pattern of the program, the program comprising a plurality of application elements comprising a text field having a text section, and a memory access field, the method comprising the steps of implementing memory access data in the memory access field in order to affect memory access of the application element, the text section being unchanged by the memory access data implementation.

In a further embodiment the method comprises a method of compiling a program, wherein the program includes a plurality of application elements comprising a text field containing a text section, the method comprising the steps of writing memory access options into the application elements for affecting memory access patterns of the program during runtime, and providing a memory access field for the application element, the value of a datum in the memory access field being arranged to implement memory access options.

In a further embodiment, the method comprises a method of executing an application element of a program at runtime, the application element comprising a text field containing a text section, and a memory access field, the memory access field containing memory access data arranged to affect memory access of the application element during runtime, the method comprising the steps of running the application element and controlling memory access of the application element in accordance with the memory access data.

In a further embodiment the method comprises, in a computing system having a processor and a memory, a method of affecting memory access patterns of a program during execution, comprising the step of implementing a memory access data of an application element of the program the memory access data not being contained in a text field of the application element, the memory access datum being arranged to affect memory access of the application element.

In a further embodiment the method comprises, in a computing system having a processor and a memory, a method of affecting memory access patterns of a program during execution, comprising the step of providing a plurality of memory access options within an application element of the program, the memory access options being selectable to affect memory access of the application element.

There will also be provided a data structure for an application element.

In one embodiment the data structure for an application element comprises a text section for containing instructions, and a memory access field, the memory access field being arranged to contain memory access data for affecting memory access of the application element during runtime execution.

There will also be provided computer programs including instructions for controlling a computer to implement one or more of the method embodiments discussed above.

FIG. 1 is a schematic block diagram of an example computing system which may be utilised for implementation of a method and system in accordance with an embodiment of the present invention.

The illustrated computing system comprises a computer 100 which includes a processor 102 and memory 103. The processor 102 is arranged to process program instructions and data in a known manner. Memory 103 is arranged to store programme instructions and data also in a known manner. Processor 102 may constitute one or more processing means, such as integrated circuit processors. The memory 103 may comprise any known memory architecture and may include hard disk, IC memory (ROM, PROM, RAM, etc), floppy disks and other types of additional memory such as CD ROM, and any other type of memory.

A BUS 104 is provided for communication between the processor 102 and memory 103 and also communication with external components. In this case the external components include a user interface 105. The user interface 105 includes a visual display unit 106 for displaying information to a user. The VDU 106 may display information in graphical format or any other format depending upon the program instructions being processed by processor.

The user interface 105 also includes user input means 107 which in this example include a keyboard 108 (which in this example may be a standard QWERTY keyboard) and a mouse 109. The mouse 109 may be used to manipulate a graphical user interface (GUI) if a GUI is provided by software running on the computer. A network connection 110 is also provided for connecting to a network which may include a communication network and other computers/computing systems.

The computing system of FIG. 1 may be implemented by any known type of computing hardware such as, for example, a PC, by a number of networked PCs if required to implement a system of this embodiment, by a "mainframe architecture" including a remote computer and user workstations connected to the remote computer, by a client-server architecture, including a client computer accessing a server computer over a network, or by any other computing architecture.

The computing system need not be connected to a network if this is not required by the software or computer architecture.

In this embodiment the computing system may be configured for compiling programs to run on target computing systems (eg end user computing systems) and includes a compiler, in this embodiment in the form of software (not shown). In accordance with an embodiment of the invention, the computing system also includes a memory access optimizer, also in the form of a software in this embodiment for monitoring operation of a compiled program during runtime and improving memory access of the program in accordance with an embodiment of the present invention.

Further, in this embodiment, the computer system has access to a program library (not shown) over the network, where applications may be stored and shared, for facilitating building of programs.

The computing system of this embodiment is also configured with IPF (Itanium Processor Family) architecture and includes a Performance Monitoring Unit (PMU), Data Event Address Register (DEAR), and IP EAR of a Montecito processor. It should be noted that the present invention is not limited for use with IPF architecture, but may also be applied with other computer architectures.

Programs compiled and tested on this computing system may then be run on computing systems in accordance with further embodiments of the present invention, for example end user PCs or other types of end user computing system for running programs.

As discussed above, the computing system includes a compiler for compiling source code prepared by the programmer to run on a target operating system. In this embodiment of the invention, the compiler is arranged to incorporate memory access options within the text section of application elements making up the program and also provide a data space for containing a value able to control the selection of the memory access options.

As discussed above, the computing system also includes a memory access optimizer, in this embodiment being termed a dynamic optimizer, which is arranged to monitor operation of the compiled program during runtime and affect the memory access patterns of the program by implementing memory access data in the data space provided in the compiled application elements.

In more detail, the dynamic optimizer monitors the memory access performance of the software during runtime and determines what improvements need to be made to the memory access pattern. For example, in one embodiment the dynamic optimizer would use the Performance Monitoring Unit (PMU) of the IPF architecture to obtain memory related data.

The dynamic optimizer utilises the Data Event Address Register (DEAR) to find out loads with high latency and uses the IP-EAR of the Montecito processor to find out the hot stores. The IP-EAR can also be used to find out memory traffic indicators such as excessive L1 fill traffic, L2 OzQ over-subscription, and L2 bank conflicts. The DTLB misses can also be captured using the DEAR and may be used in optimizing memory access patterns. All these data may be used to identify poorly behaving memory access instructions.

In accordance with this embodiment, in order to improve memory access, the dynamic optimizer affects the memory access data in the memory access field of the application elements in order to improve the memory access behaviour. For example, for stores with high latency, the dynamic optimizer enables a corresponding prefetch instruction in the relevant application element(s) by inputting or changing the memory access data in the memory access field of the application element(s). For heavy memory traffic, the dynamic optimizer would suitably change the prefetch hint or disable a prefetch to reduce the traffic to memory.

In more detail, for every memory access control instruction in an application element text, such as every prefetch instruction that can be potentially enabled/disabled or modified by the dynamic optimizer, the compiler generates data (could be a byte) in the memory access field. The value of the data in the memory access field will enable/disable the prefetches. The dynamic optimizer writes to this field to enable/disable the prefetches. The code generated by the compiler may be like— ld4 rx, [ry];//ry contains the address to the memory access field.

$Cmp4 \cdot eq\ px,\ py=ry \cdot r0$ (px) lfetch.nt1 [rz],c//active prefetch
(py) add rz,c,rz//prefctch inactive, only the post increment happens.

The application element then either executes the lfetch instruction or the corresponding add instruction for post incrementing prefetches. For non-post incrementing prefetches, we would not need the add instruction. If the value of the data is 1, the cmp instruction would set predicate register px to 1 and py to 0. In effect, the lfetch would be executed and the add instruction would be predicated off. On the other hand, a 0 value of the data would result in the lfetch being predicated off and the add to execute effectively. This is how the data value guides the execution path of the prefetch instructions.

The extra instructions may take 2 cycles (if the data is in L1 cache, the load should take a cycle and the cmp should take another cycle) for each such prefetch. The load and stores are of high latency, so the prefetch also requires long latency to access the data from memory. This would mean that the increase of 2 cycles for the approach of this embodiment is negligible compared to the prefetch latency.

For prefetch hint changing, the optimizer writes different values to the same memory access file. The compiler to generate an extra instruction to compare the data to different values. Also, the necessary lfetch instructions (active, inactive or modified) are generated in duplicate, although only one form of the instruction will be executed at runtime. The compiler might generate the lfetch with the most suitable hint. After analyzing the code, if the compiler finds that a prefetch would not be a candidate to heavy memory traffic, it can restrict itself in generating only the active and inactive form of the prefetch. The hint modification may be used judiciously, also the extra instructions in the case of heavy memory traffic may actually widen the gap between the memory instructions, reducing the rate of memory traffic.

The compiler generates extra information in the annotation section of the application element. The annotation section may contain data locations corresponding to a prefetch. Also, the annotation section would suggest the values needed for indicating prefetch enable, disable or hint modification. For example, a value of 0 might indicate disabled prefetch, 1 would indicate enables prefetch, 2 might mean a prefetch with nt1 hint.

The Benefits of the approach of this embodiment are—
- All the dynamic optimizer needs to do is to update the data field. The annotation section can contain the address of the data field. This avoids any write to text, so text can be mapped and shared as usual.
- No need to analyse the annotations and decode/encode instructions from the text page, all that the optimizer needs to do is to update the data field with proper values.
- Thread-safety issues are easier to handle. Any thread reading this data byte can either read a value (depending on race condition with the optimizer writing to the data field), but at worst one iteration of optimal prefetch would be missed and the next execution of the prefetch would be correct.
- These extra instructions have to be executed in the program element. The load instruction for the data value should not take much time as after the first load, it should be in the cache.

Figure 2:
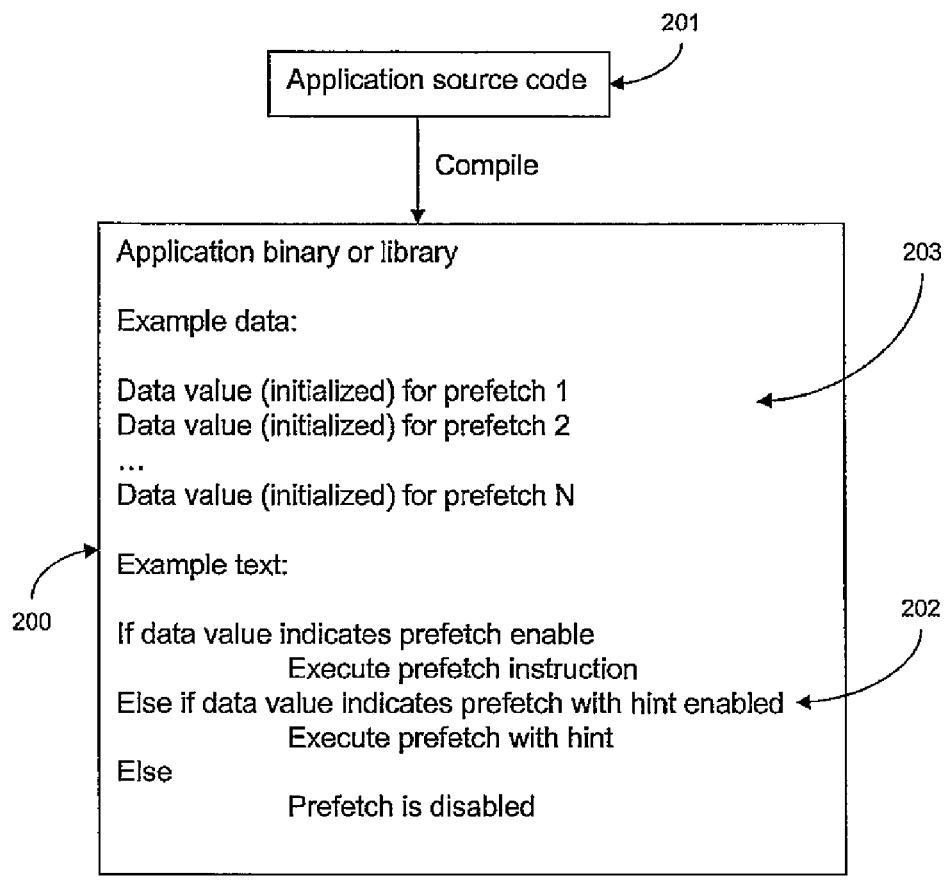
FIG. 2 is a diagram illustrating a layout of an application element generated on compilation, in accordance with an embodiment of the present invention.

Referring to FIG. 2, a schematic diagram of an application element in accordance with an embodiment of the present invention, generally designated by reference numeral 200 is illustrated. The application element has been compiled by the compiler from application source code 201. The application element comprises a data structure including text 202 and a memory access field for containing data values 203. Data values, in accordance with this embodiment, are for control of memory access during run time of the program. For example data are illustrated in FIG. 2, designated by reference numeral 203. The compiler in this embodiment provides the memory access field and also initializes a data value. This data value may then be changed (or left as it is) by the optimizer. When the data value is initialized by the compiler, it will be initialized to be enabled or disabled, for example, as a default condition. FIG. 2 merely gives examples of the type of data that may be included.

Figure 3:
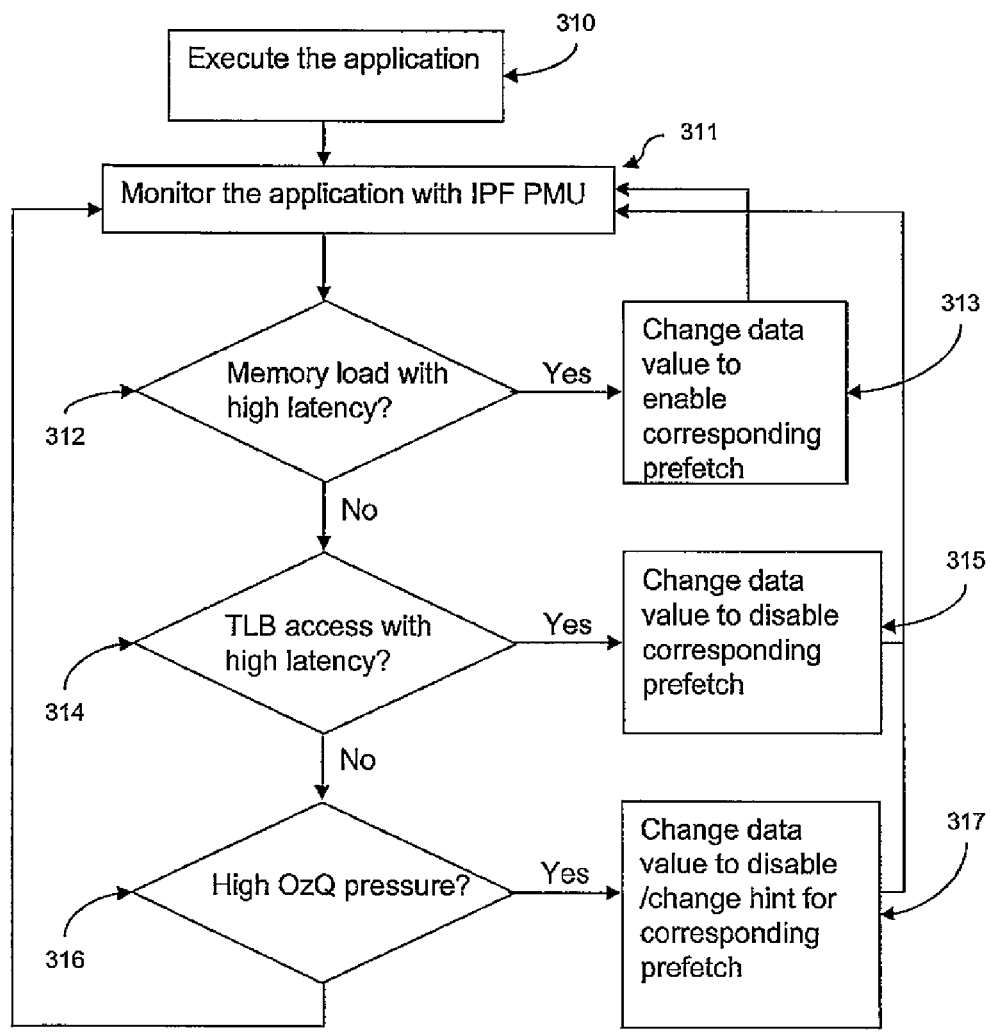
FIG. 3 is a flow diagram illustrating operation of a dynamic optimizer in accordance with an embodiment of the present invention, during runtime.

FIG. 3 is a flow chart illustrating execution of a program at runtime and implementation of the memory access optimizer to improve the memory access patterns. At step 310, the program is run. The dynamic optimizer monitors the execution of the application, reference numeral 311, utilizing such facilities as the IPF PMU and others. If the memory load is determined to have high latency (Block 312) then the data value in the memory access field is input or changed to enable a corresponding prefetch (Block 313).

Conversely, if a TLB access has high latency (Block 314) then the data value is changed or entered to disable the corresponding prefetch (Block 315). If high OzQ pressure is detected (Block 316) then the data value is input or changed to disable/change the hint for the corresponding prefetch (Block 317).

It will be appreciated that memory access may be affected in other ways and in response to other circumstances detected by the memory optimizer, and the circumstances are not limited to only those disclosed with reference to FIG. 3.

In the above embodiment, the prefetch instructions are enabled or disabled in order to affect the memory access pattern. The invention is not limited to manipulating prefetch instructions to affect memory access patterns. The memory access field may include data effecting changes to other parameters or instructions which affect memory access. For example, in a further embodiment, the data value may affect the selection of a routine to use in the next step of program execution. For example, the data may decide that a different routine in a branch decision should be used because of a preferred memory access pattern. In this case, the dynamic optimizer would monitor the branch direction and if the result is in favour of one direction of a branch, the optimizer changes the data value for the appropriate data field. The data field could be generated by a compiler and the data value can be used to influence the default branch direction.

An advantage of the above embodiments of the invention is that there is no need to write to the text section of the application element in order to control memory access. This reduces side effects like increased pressure on swap space due to private text pages in software libraries. Further, the dynamic optimizer does not require super user privileges to effectively improve the memory access behaviour of the application at run time.

The foregoing description of the exemplary embodiments is provided to enable any person skilled in the art to make or use the present invention. While the invention has been described with respect to particular illustrated embodiments, various modifications to these embodiments will be readily apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

What is claimed is:

1. A computing system comprising:
   a processor;
   a memory;
   a memory access optimizer configured to affect memory access of a program during runtime execution of the program;
   the program including a plurality of application elements comprising a text field containing a text section, and a memory access field, the memory access optimizer configured to implement memory access data in the memory access field in order to affect memory access of the application element, whereby the memory access optimizer is configured to prevent change to the text section by the memory access data implementation.

2. A computing system in accordance with claim 1, wherein, the memory access data is arranged to control a prefetch instruction for affecting a prefetch of data from memory.

3. A computing system in accordance with claim 1, wherein the memory access data is arranged to control selection of a program routine for execution.

4. A computing system in accordance with claim 1, further comprising:
   a compiler arranged to implement memory access options within a program including a plurality of application elements, the memory access options being arranged to affect memory access patterns of the program during runtime, and the compiler being arranged to provide a memory access field in the application elements, wherein the value of a datum in the memory access field is arranged to implement the memory access options.

5. A computing system in accordance with claim 4, wherein the memory access options include an instruction for causing prefetch of data from memory.

6. A computing system in accordance with claim 4, wherein the memory access options include an instruction for selection of a program routine.

7. A method of compiling a computer program, wherein a computer has instructions stored in non-transitory memory executable by a processor and the computer program includes a plurality of application elements comprising a text field containing a text section, the method comprising:
   writing memory access options into the application elements for affecting memory access patterns of the computer program during runtime
   providing a memory access field for the application element(s), wherein the value of a datum in the memory access field is arranged to implement memory access options; and
   implementing memory access in the memory access field in order to affect memory access of the application elements, wherein implementing the memory access in the memory access field is performed in a manner to prevent change to the text section while implementing memory access in the memory access field.

8. A method in accordance with claim 7, wherein the memory access options include instructions for causing a prefetch of data from memory.

9. A method in accordance with claim 7, wherein the memory access options include an instruction for selection of a program routine.

10. A computing device, including instruction stored in non-transitory memory and executed by a processor to control compiling of a program the program having a plurality of application elements including a text field and a text section, where the instructions are executed to:
   write memory access options into the application elements for affecting memory access patterns of the computer program during runtime;
   provide a memory access field for the application element(s), wherein a value of a datum in the memory access field is configured to implement memory access options; and
   implement memory access in the memory access field in order to affect memory access of the application elements, wherein implementing the memory access in the memory access field is performed in a manner to prevent change to the text section while implementing memory access in the memory access field.

* * * * *